(12) United States Patent
Lecocq et al.

(10) Patent No.: US 9,963,646 B2
(45) Date of Patent: May 8, 2018

(54) OPTIMISATION OF THE USE OF HYDROGEN FOR HYDROTREATMENT OF HYDROCARBON FEEDSTOCKS

(71) Applicant: IFP Energies Nouvelles, Rueil-Malmaison (FR)

(72) Inventors: Vincent Lecocq, Orlienas (FR); Anne Claire Pierron, Saint Maurice l'Exil (FR); Thomas Plennevaux, Lyons (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 99 days.

(21) Appl. No.: 15/220,708

(22) Filed: Jul. 27, 2016

(65) Prior Publication Data
US 2017/0029717 A1    Feb. 2, 2017

(30) Foreign Application Priority Data

Jul. 28, 2015  (FR) ..................... 15 57212

(51) Int. Cl.
| | |
|---|---|
| *C10G 45/02* | (2006.01) |
| *C10G 45/04* | (2006.01) |
| *B01D 19/00* | (2006.01) |
| *C10G 65/04* | (2006.01) |

(52) U.S. Cl.
CPC ......... *C10G 45/04* (2013.01); *B01D 19/0036* (2013.01); *C10G 45/02* (2013.01); *C10G 65/04* (2013.01); *C10G 2300/202* (2013.01); *C10G 2300/4081* (2013.01); *C10G 2400/02* (2013.01); *C10G 2400/04* (2013.01)

(58) Field of Classification Search
CPC .................................................. C10G 45/02
See application file for complete search history.

(56) References Cited

U.S. PATENT DOCUMENTS

| | | | |
|---|---|---|---|
| 9,617,479 B2* | 4/2017 | Fingland | .................. C10G 3/50 |
| 2006/0118466 A1 | 6/2006 | Galeazzi et al. | |
| 2006/0131212 A1* | 6/2006 | Dahlberg | ............... C10G 65/10 208/59 |
| 2013/0098803 A1 | 4/2013 | Zimmerman et al. | |
| 2015/0353844 A1* | 12/2015 | Hoehn | .................. C10G 45/12 208/212 |

FOREIGN PATENT DOCUMENTS

WO    2012/140333 A1    10/2012

OTHER PUBLICATIONS

Search Report dated May 31, 2016 issued in corresponding FR 1557212 application (2 pages).

* cited by examiner

*Primary Examiner* — Randy Boyer
(74) *Attorney, Agent, or Firm* — Millen White Zelano and Branigan, PC (57) ABSTRACT

A process for the hydrotreatment of a hydrocarbon feedstock in which:
- a) at least one hydrotreatment step is implemented in which at least a part of said feedstock and a gaseous flow comprising hydrogen is brought into contact with a hydrotreatment catalyst to obtain a hydrotreated effluent comprising hydrogen, and sulphurous and nitrogenous compounds;
- b) the hydrotreated effluent is separated to obtain a first gaseous effluent and a first liquid effluent;
- c) the first liquid effluent is expanded and the first liquid effluent is separated to obtain a second gaseous effluent and a second liquid effluent;
- d) the second gaseous effluent is cooled and separated to obtain a third gaseous effluent and a third liquid effluent; and
- e) a part of the third gaseous effluent is recycled.

15 Claims, 4 Drawing Sheets

OPTIMISATION OF THE USE OF HYDROGEN FOR HYDROTREATMENT OF HYDROCARBON FEEDSTOCKS

TECHNICAL FIELD

The present invention concerns the hydrotreatment of hydrocarbon cuts and more particularly gasoline cuts or middle distillates, to produce hydrocarbon cuts with a low content of sulphur, nitrogen and optionally aromatic compounds.

STATE OF THE ART

Hydrocarbon feedstocks (also referred to as hydrocarbon charges) and more particularly cuts of middle distillates type, originating both from direct distillation of a crude oil or issuing from a catalytic cracking process, contain significant amounts of impurities.

In general terms those impurities are removed by way of a hydrotreatment process which makes it possible to reduce the presence of sulphur or other heteroatoms like nitrogen, but also by reducing the content of aromatic hydrocarbon compounds by hydrogenation to increase the cetane number.

In particular the aim of the process for hydrotreatment of hydrocarbon cuts is to remove sulphurous or nitrogenous compounds contained therein in order for example to adjust a petroleum product to the required specifications (content of sulphur, content of aromatics etc) for a given application (motor fuel, gasoline or gas oil, domestic fuel oil, jet fuel). The increasing severity of the motor vehicle pollution standards in the European Community has forced refiners to very greatly reduce the sulphur content in diesel fuels and gasolines (at the maximum 10 parts per million by weight (ppm) of sulphur on 1 Jan. 2009, as against 50 ppm on 1 Jan. 2005).

The conventional hydrotreatment processes generally use a fixed bed reactor in which one or more catalytic beds containing one or more hydrotreatment catalysts are disposed. The feedstock and hydrogen are generally introduced at the head of the reactor and pass downwardly through the reactor in descending co-flow relationship. When the feedstock and hydrogen pass through the reactor the hydrotreatment reaction makes it possible to decompose the impurities, in particular the impurities comprising sulphur or nitrogen and possibly to partial remove the aromatic hydrocarbon compounds and more particularly the polyaromatic hydrocarbon compounds. Destruction of the impurities results in the production of a hydrorefined hydrocarbon product and an acid gas with a high $H_2S$ and $NH_3$ content, which gases are known to be inhibiters and even in some cases poisons in respect of the hydrocarbon catalysts. The easiest hydrotreatment reactions generally take place in the upper part of the reactor, then become increasingly difficult as the feedstock and the hydrogen progressively pass through the reactor. That loss in effectiveness is due not only to the fact that the hydrocarbon feedstock comprises sulphurous compounds which are the most resistant to the hydrogenation reactions but also because the gas phase comprising hydrogen becomes charged with inhibiter compounds ($NH_3$ and $H_2S$), which consequently reduces the hydrogen partial pressure. Therefore substantial amounts of catalysts have to be implemented in order to compensate for that drop in reactivity.

To remedy that difficulty it is generally proposed in the state of the art that the hydrotreatment process be operated in simulated counter-flow relationship. That process uses a succession of fixed beds in co-flow relationship but with an overall circulation of hydrogen and the feedstock in counter-flow relationship. In the case of two successive fixed beds the hydrocarbon feedstock is introduced into the first reactor in co-flow relationship with the impure hydrogen issuing from the second reactor. The liquid effluent from the first hydrotreatment reactor is separated from the gas phase containing impurities ($H_2S$, $NH_3$) by hydrogen stripping or flash or by any other separation means known to the man skilled in the art (for example a chain arrangement of flashes). That gaseous flow is purified before being re-injected with the liquid effluent from the first reactor into a second finishing hydrotreatment reactor. The liquid effluent from the second reactor is separated from the gas phase containing impure hydrogen charged with impurities ($H_2S$, $NH_3$), the impure hydrogen then being recycled to the first reactor. Overall the circulation of hydrogen is in counter-flow relationship with that of the feedstock.

Whether considering one or other of the two types of hydrotreatment processes, that is to say in co-flow or in counter-flow relationship the consumption of hydrogen necessary to implement feedstock hydrotreatment is often poorly controlled. Indeed, on issuing from the hydrotreatment reactors, a substantial amount of hydrogen is to be found in the liquid effluents in the dissolved state and is not recovered to be recycled upstream of the hydrotreatment reactors. That loss of hydrogen then has to be compensated by adding a make-up amount of hydrogen, in addition to the make-up hydrogen linked to the chemical consumption by the hydrotreatment reactions, in order to maintain a constant hydrogen coverage rate.

The present invention proposes modifying the conventional configurations for the hydrotreatment of hydrocarbon feedstocks, both in co-flow and in simulated counter-flow relationships, in order to optimise the consumption of hydrogen necessary for the hydrotreatment reactions of such feedstocks. Indeed, to maximise the recovery of unconsumed hydrogen at the exit from a hydrotreatment process the applicant developed a process in which the hydrotreated effluent (that is to say at the exit from the (last) hydrotreatment reactor) is passed into a particular succession of separation steps making it possible to improve recovery of the unconsumed hydrogen with a view to recycling thereof upstream of the hydrotreatment process.

The process according to the invention comprises the following steps:
a) at least one hydrotreatment step is implemented in which at least a part of said feedstock and a gaseous flow comprising hydrogen is brought into contact with at least one hydrotreatment catalyst to obtain a hydrotreated effluent comprising hydrogen, and sulphurous and nitrogenous compounds;
b) gas/liquid separation of said hydrotreated effluent obtained in step a) is implemented to produce at least one first gaseous effluent and at least one first liquid effluent;
c) the first liquid effluent obtained in step b) is expanded to a pressure of between 0.5 and 4 MPa to obtain at least one second gaseous effluent comprising hydrogen and sulphurous and nitrogenous compounds, and at least one second liquid effluent;
d) said second gaseous effluent obtained in step c) and comprising hydrogen and sulphurous and nitrogenous compounds is cooled and then separation of said second gaseous effluent is effected to obtain at least one third gaseous effluent comprising hydrogen, sulphurous and nitrogenous compounds and at least one third liquid effluent; and e) at least a part of said third gaseous effluent obtained in step d) comprising hydrogen and sulphurous and nitrogenous compounds is recycled to step a) as a gaseous flow comprising hydrogen provided to step a).

SUBJECTS OF THE INVENTION

The subject of the present invention is a process for the hydrotreatment, preferably in a fixed bed, of a hydrocarbon feedstock comprising sulphurous and nitrogenous compounds, in which the following steps are effected:

a) at least one hydrotreatment step is implemented in which at least a part of said feedstock and a gaseous flow comprising hydrogen is brought into contact with at least one hydrotreatment catalyst to obtain a hydrotreated effluent comprising hydrogen, and sulphurous and nitrogenous compounds;

b) gas/liquid separation of said hydrotreated effluent obtained in step a) is implemented to produce at least one first gaseous effluent and at least one first liquid effluent;

c) the first liquid effluent obtained in step b) is expanded to a pressure of between 0.5 and 4 MPa and said first liquid effluent is separated to obtain at least one second gaseous effluent comprising hydrogen and sulphurous and nitrogenous compounds, and at least one second liquid effluent;

d) said second gaseous effluent obtained in step c) and comprising hydrogen and sulphurous and nitrogenous compounds is cooled and then separation of said second gaseous effluent is effected to obtain at least one third gaseous effluent comprising hydrogen, sulphurous and nitrogenous compounds and at least one third liquid effluent; and e) at least a part of said third gaseous effluent obtained in step d) comprising hydrogen and sulphurous and nitrogenous compounds is recycled to step a) as a gaseous flow comprising hydrogen provided to step a).

Advantageously in step e) said part of said third gaseous effluent is mixed with a gaseous hydrogen make-up flow.

Preferably in step d) said second gaseous effluent is cooled to a temperature of between 10 and 120° C.

Advantageously between steps a) and b) of the process according to the invention the hydrotreated effluent obtained in step a) is cooled to a temperature of between 20 and 320° C.

In a first embodiment of the invention said hydrotreatment step a) is carried out in a reaction zone in which said feedstock and said gaseous flow comprising hydrogen circulate in descending co-flow relationship in said reaction zone to obtain a hydrotreated effluent comprising hydrogen and sulphurous and nitrogenous compounds.

Advantageously said first gaseous effluent obtained in steps b) is cooled then passed into a separator balloon flask to obtain a gaseous flow, a liquid hydrocarbon fraction and an aqueous liquid fraction.

Preferably said third gaseous effluent comprising hydrogen and sulphurous and nitrogenous compounds is passed into a washing unit comprising an absorbent solution comprising amines.

Advantageously said gaseous flow is passed into the washing unit comprising an absorbent solution comprising amines.

Preferably the head flow issuing from the washing unit is recycled upstream of the hydrotreatment step as the gaseous flow comprising hydrogen.

In a second embodiment of the invention the hydrotreatment step a) is carried out in a first reaction zone to produce a partially hydrotreated feedstock and then in a second reaction zone to obtain a hydrotreated effluent comprising hydrogen and sulphurous and nitrogenous compounds.

Advantageously between the first reaction zone and the second reaction zone a step for separation of said partially hydrotreated feedstock comprising hydrogen and sulphurous and nitrogenous compounds is effected to produce at least a gaseous fraction and a liquid fraction.

Preferably said liquid fraction is passed into said second reaction zone and said gaseous fraction is cooled and then passed into a balloon separator flask to obtain a gaseous flow, a liquid hydrocarbon fraction and an aqueous liquid phase.

Preferably said third gaseous effluent comprising hydrogen and sulphurous and nitrogenous compounds is passed into a washing unit comprising an absorbent solution comprising amines.

Advantageously said gaseous flow is passed into the washing unit comprising an absorbent solution comprising amines and the head flow issuing from the washing unit is recycled upstream of the second reaction zone as the gaseous flow comprising hydrogen.

Preferably the first gaseous effluent obtained in step d) is passed upstream of the first reaction zone.

DETAILED DESCRIPTION OF THE INVENTION

The present invention concerns a hydrotreatment process, preferably a fixed-bed process. The term "hydrotreatment" is used to denote any reaction which makes it possible to remove the impurities in the feedstock (also referred to here as the cut) and in particular hydrodesulphurisation and hydrodenitrogenation, but also reactions for the hydrogenation of unsaturations and/or aromatic rings (hydrodearomatisation) and hydrocracking reactions which lead to naphthenic ring opening or fractionation of paraffins into a plurality of fragments of lower molecular weight.

The present invention is also applied to the process for hydrotreatment in simulated counter-flow relationship (that is to say the feedstock and hydrogen circulate through a succession of beds, preferably fixed beds, in co-flow relationship, but with an overall circulation of the hydrogen and feedstock in counter-flow relationship), and to the more conventional hydrotreatment process in which feedstock and hydrogen circulate overall in co-flow relationship.

A typical feedstock of the process according to the invention is a feedstock of middle distillates. In the sense used in the present invention the term middle distillate denotes hydrocarbon cuts boiling in a range of from of about 130° C. to about 410° C., preferably about 140° C. to about 375° C. and for example about 150° C. to about 370° C. A feedstock of middle distillates may also comprise a gas oil or diesel cut, or can be referred by one of those names.

The process of the present invention may also find application in the treatment of hydrocarbon cuts resulting from direct distillation of crude oil having a boiling point in the range of the naphthas. The process can be used for producing hydrocarbon cuts which can be employed as solvents or as diluents and preferably containing a reduced amount of aromatic compounds; the term naphtha denotes a hydrocarbon fraction ranging from hydrocarbons having 5 carbon atoms to hydrocarbons having a final boiling point of about 210° C.

The process can also be used for the hydrotreatment and desulphurisation of gasoline, in particular gasoline produced in a fluidised-bed catalytic cracking installation (in accordance with the process known by the name FCC) or other gasoline fractions resulting for example from coking, visbreaking or residue hydroconversion units, the term gasoline denotes a hydrocarbon fraction resulting from a cracking unit, boiling at between about 30° C. and about 210° C.

Another possible feedstock is kerosene. The term kerosene denotes a hydrocarbon cut boiling in a range of 130° C. to 250° C. approximately.

The process of the invention can also be used for the hydrotreatment of heavier cuts such as the vacuum distillate which boils in the range of 370° C. to 565° C. approximately.

The process of the invention can also be used for the hydrotreatment of cuts which are heavier than the vacuum distillate, in particular deasphalted oil cuts.

The term deasphalted oil denotes a cut which boils above 565° C. approximately (or a slightly lower temperature such as 525° C. approximately), obtained by deasphalting of a heavy residue, for example vacuum residue, by a solvent of propane, butane, pentane, light gasoline type or any other suitable solvent known to the man skilled in the art.

The process can finally be used for the hydrotreatment of a broader hydrocarbon cut, resulting for example (non-limiting) from a mixture of at least two of the above-defined hydrocarbon cuts.

Hydrotreatment Process in Simulated Counter-Flow Relationship

In order better to understand the invention the description set forth hereinafter by way of example of the application thereof concerns on the one hand a hydrotreatment process known in the state of the art in which the feedstock and hydrogen circulate overall in counter-flow relationship (see FIG. 1) and on the other hand a hydrotreatment process according to the invention in which the feedstock and hydrogen circulate overall in counter-flow relationship (see FIG. 2).

Figure 1:
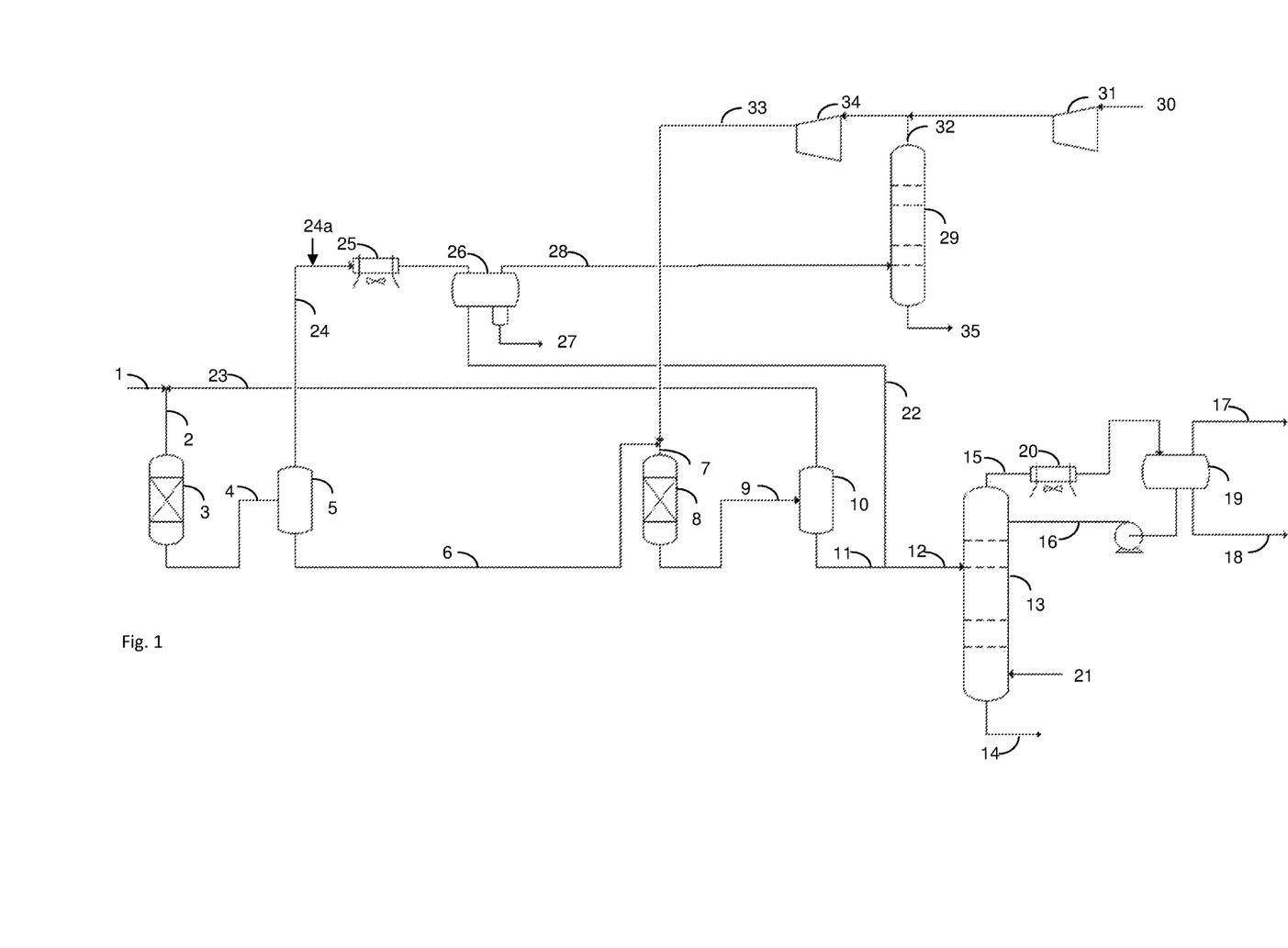
FIG. 1 is a representation of an operating diagram of a hydrotreatment installation according to the state of the art in which the feedstock and hydrogen circulate overall in counter-flow relationship (simulated counter-flow relationship).

Reference will now be made to FIG. 1 showing an operating diagram of a hydrotreatment installation process known in the state of the art, in which the feedstock to be hydrotreated and the hydrogen circulate overall in counter-flow relationship (simulated counter-flow).

The feedstock of the hydrotreatment installation is supplied by way of line 1 and then heated in an oven (not shown in the Figure) in which the temperature of the feedstock is raised to the temperature required for the first hydrotreatment reaction step. The feedstock has added thereto a gaseous recycling flow with a high hydrogen content which circulates in the line 23 upstream or downstream of the oven (not shown in the Figure). The mixture formed in that way circulates in the line 2, and then feeds the hydrotreatment reactor 3 (also referred to herein as the first reaction zone 3) which is typically a reactor with a fixed catalytic bed and a descending flow. The effluent from that reactor, that is to say the partially hydrotreated feedstock, is discharged by way of the conduit 4 to be introduced into a separator balloon flask 5. The flask 5 permits separation of a gaseous fraction 24 and a liquid fraction 6. The gaseous fraction 24 is cooled by way of one or more heat exchangers 25 (here an air cooler) to be partially condensed before being separated in a separator balloon flask 26 of gas/liquid/liquid type. A water flow 24*a* is preferably added to the gaseous fraction 24 to permit dissolution of the $NH_3$ present in the gaseous fraction in an aqueous liquid phase.

The separator flask 26 implements separation into three phases:
 a gaseous flow 28;
 a liquid hydrocarbon fraction 22 with a very low sulphur content, for example of less of 10 ppm, said fraction being discharged downstream of the process (that is to say it is not treated in the second hydrotreatment reaction step); and
 an aqueous liquid phase 27 which moreover generally contains nitrogenous and sulphurous impurities (such as ammonium sulphide salts).

The gaseous flow 28 comprising hydrogen and acid gases is introduced into an amine-type washing unit 29.

The hydrogen-rich flow 32 issuing from the amine-type washing unit 29 is then compressed by way of a compressor 34 and then the compressed flow 33 is passed into a second hydrotreatment reactor 8 (also referred to herein as the second reaction zone 8), together with the liquid fraction 6 by way of the line 7, to produce a hydrotreated effluent 9 comprising hydrogen and nitrogenous and sulphurous compounds. The hydrotreated effluent 9 is discharged to be introduced into a separator balloon flask 10 referred to as the "second reaction step gas/liquid separator" in order to obtain a liquid effluent 11 and a gaseous effluent 23. The gaseous effluent 23 comprising hydrogen is recycled upstream of the first hydrotreatment reaction step. The liquid effluent 11 and optionally the liquid hydrocarbon fraction 22 are passed by way of the line 12 towards a stripping unit 13 (also referred to herein as the stripping column) which is fed with stripping steam 21. The gaseous fraction 15 is recovered at the head of the stripping column 13 and then cooled by way of one or more heat exchangers 20 (here an air cooler) before being introduced into a separator balloon flask 19 to obtain a gaseous flow 17 comprising mainly hydrogen, $H_2S$ and light hydrocarbons such as methane, a liquid flow 18 comprising mainly compounds of naphtha type, and a liquid flow 16 passed into the stripping column 13 as a reflux. The heavy fraction 14 comprising the hydrotreated hydrocarbon feedstock of middle distillates is recovered at the bottom of the stripping column 13.

In the context of a simulated counter-flow hydrotreatment process according to the state of the art as shown in FIG. 1 a substantial part of hydrogen is not recovered and occurs in the dissolved state in the liquid effluent 11 as the gas/liquid separation step implemented in the separator flask 10 on issuing from the second reactor 8 is performed at the pressure and temperature of that reactor 8, that is to say typically at a temperature of 360° C. and a pressure of between 3 and 13 MPa, within the context of cuts of middle distillates with a very low sulphur content. The liquid effluent 11, at the exit temperature and pressure of the reactor 8, then comprises a part of hydrogen which is not consumed in a dissolved form, which cannot be re-used. The amount of hydrogen dissolved depends on the temperature and more particularly the pressure of the reactor; the solubility of the hydrogen in the liquid phase being directly proportional to the pressure in the reactor (Henry's law). The loss in terms of hydrogen by dissolution corresponds to the hydrogen present in the conduit 12 at the entry to the stripping column 13 and at the exit 35 from the amine-type washing unit. To remedy that hydrogen loss and also the hydrogen loss due to the chemical consumption of hydrogen in the hydrotreatment reaction, make-up hydrogen 30 is generally introduced into the process between the first and second reaction zones, together with the hydrogen-rich flow 32 issuing from the amine-type washing unit 29. The hydrogen is preferably compressed by way of a compressor 31 before being mixed with the flow 32.

In order to maximise recovery of hydrogen which has not been consumed at the exit from the hydrotreatment process the applicant developed a process in which the effluent from the hydrotreatment operation is subjected to a particular chain succession of separation steps making it possible to significantly reduce the hydrogen content in the hydrotreated feedstock to the required specifications, therefore making it possible to improve hydrogen recycling upstream of the hydrotreatment process.

Figure 2:
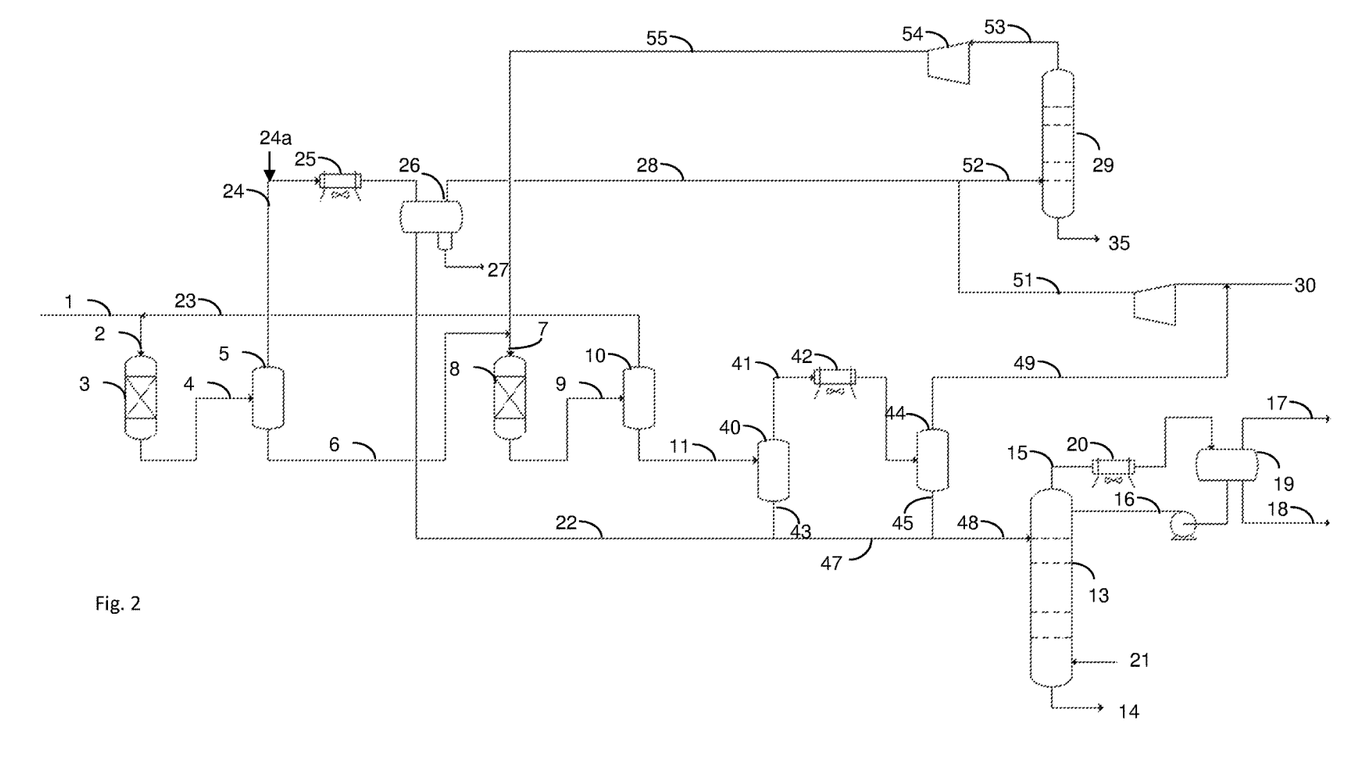
FIG. 2 is a representation of an operating diagram of a hydrotreatment installation according to the invention in which the feedstock and hydrogen circulate overall in counter-flow relationship (simulated counter-flow relationship). In this figure references identical to those in FIG. 1 denote similar or identical elements.

More particularly and with reference to FIG. 2 showing an operating diagram of a hydrotreatment installation according to the invention the feedstock, for example a cut of middle distillates produced from direct distillation, is fed by the line 1 and then heated in an oven (not shown in the Figure) in which the temperature of the feedstock is raised to the temperature required for the first hydrotreatment reaction step. There is then added to the feedstock a gaseous recycling flow (upstream or downstream of the oven) with a high hydrogen content, that circulates in the line 23. The mixture formed in that way flows in the line 2 to then feed the hydrotreatment reactor 3 which is typically a reactor with a fixed catalytic bed with a descending flow therein. The effluent from that reactor, that is to say the partially hydrotreated feedstock, is discharged by way of the conduit 4 to be introduced into a separator balloon flask 5. The flask 5 makes it possible to separate a gaseous fraction 24 and a liquid fraction 6. The gaseous fraction 24 is cooled by way of one or more heat exchangers 25 (here an air cooler) to be partially condensed before being separated in a separator flask 26 of gas/liquid/liquid type. A water flow 24a is preferably added to the gaseous fraction 24 to permit dissolution of the $NH_3$ present in the gaseous fraction in an aqueous liquid phase.

The separator flask 26 implements separation into three phases:
  a gaseous flow 28;
  a liquid hydrocarbon fraction 22, with a very low sulphur content, for example of less than 10 ppm, said fraction being discharged downstream of the process (that is to say it is not treated in the second hydrotreatment reaction step); and
  an aqueous liquid phase 27 with moreover contains generally nitrogenous and sulphurous impurities (such as ammonium sulphide salts).

The gaseous flow 28 comprising hydrogen and acid gases is introduced into an amine-type washing unit 29 by way of the line 52, together with a gaseous flow 51 optionally comprising a mixture of make-up hydrogen 30 and a gaseous effluent 49 (referred to herein as the third gaseous effluent), issuing from the second hydrotreatment reaction zone. The hydrogen-rich flow 53 from the amine-type washing unit 29 is compressed by a compressor 54 and then passed by way of the line 55 towards the second hydrotreatment reaction zone 8, together with the liquid fraction 6, by way of the line 7, to obtain a hydrotreated effluent 9 comprising hydrogen and sulphurous and nitrogenous compounds. The hydrogen make-up 30 is added to the process to compensate for the consumption of hydrogen by the hydrotreatment reactions. The hydrogen make-up 30 is introduced into and mixed with the third gaseous effluent 49.

The hydrotreated effluent 9 is optionally cooled on issuing from the second hydrotreatment reaction zone 8 by way of one or more heat exchangers (not shown in the Figure) to a temperature which is preferably between 20 and 320° C. and more preferably between 180 and 280° C. The hydrotreated effluent 9 which is possibly cooled is then discharged to be introduced into a separator balloon flask 10 referred to as the "second reaction step gas/liquid separator" to obtain a liquid effluent 11 and a gaseous effluent 23. The gaseous effluent 23 comprising hydrogen is recycled upstream of the first hydrotreatment reaction step.

The liquid effluent 11 is then expanded by being introduced into a separator flask 40 to obtain a second gaseous effluent 41 comprising hydrogen and sulphurous and nitrogenous compounds, and at least one second liquid effluent 43. The pressure in the flask 40 is between 0.5 and 4 MPa, preferably between 1 and 3 MPa. The pressure in the flask 40 is so regulated that it is approximately equal to the pressure of the hydrogen make-up 30, taking account of the pressure drops caused by the heat exchanger 42. The second gaseous effluent 41 is cooled by way of a heat exchanger 42 (here an air cooler), preferably to a temperature of between 10 and 120° C. and more preferably between 30 and 90° C. to be at least partially condensed and is introduced into a separator balloon flask 44, referred to as the flash balloon flask, in order to obtain a third gaseous effluent 49 comprising hydrogen, sulphurous and nitrogenous compounds, and a third liquid effluent 45. The pressure in the flask 44 is regulated in such a way that it is between 0.5 and 4 MPa, preferably between 1 and 3 MPa, that is to say substantially equal to the pressure of the make-up hydrogen 30, while taking account of the pressure drops caused by the heat exchanger 42.

The third gaseous effluent 49 is passed towards the amine-type washing unit 29. The third liquid effluent 45 is passed to the inlet of a stripping unit 13 (also referred to herein as the stripping column 13) by way of the conduit 48, possibly together with the second liquid effluent 43 from the separator flask 40 (by way of the conduits 47 and 48) and possibly together with the liquid hydrocarbon fraction 22 from the separator flask 26 (by way of the conduits 47 and 48). The stripping column 13 is fed with stripping steam 21. The gaseous fraction 15 is recovered at the head of the stripping column 13 and is then cooled by way of one or more heat exchangers 20 (here an air cooler) before being introduced into the separator flask 19 in order to obtain a gaseous flow 17 mainly comprising hydrogen, $H_2S$ and light hydrocarbons such as methane, a liquid flow 18 mainly comprising compounds of naphtha type, and a liquid flow 16 passed into the stripping column 13 as reflux. The heavy fraction 14 comprising the hydrotreated feedstock of middle distillates is recovered at the bottom of the stripping column 13.

Thus in the case of a simulated counter-flow hydrotreatment process according to the invention the unconsumed hydrogen dissolved in the liquid effluent from the second reaction zone 8 is recovered by virtue of the separation steps which are successively implemented in the separator flasks 40 and 44 to obtain a gaseous hydrogen-rich effluent 49 which can thus be recycled upstream of the process as a gaseous flow comprising hydrogen for implementation of hydrotreatment of the hydrocarbon feedstock.

Hydrotreatment Process in Co-Flow Relationship

In order better to understand the invention the description set forth hereinafter by way of example of the application thereof concerns on the one hand a hydrotreatment process known in the state of the art in which the feedstock and hydrogen circulate in co-flow relationship (see FIG. 3) and on the other hand a hydrotreatment process according to the invention in which the feedstock and hydrogen circulate in co-flow relationship (see FIG. 4).

Figure 3:
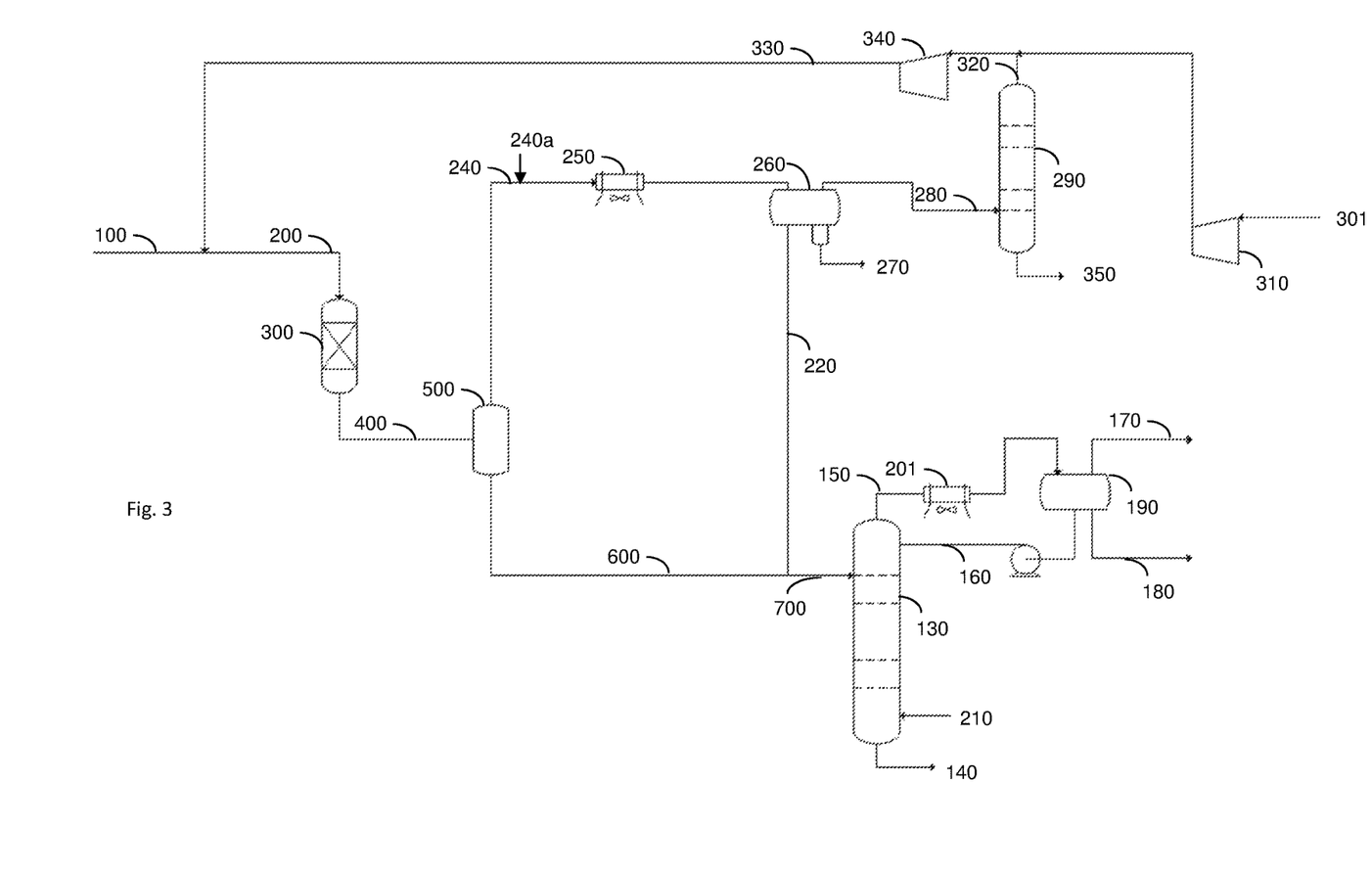
FIG. 3 is a representation of an operating diagram of a hydrotreatment process according to the state of the art in which the feedstock and hydrogen circulate in co-flow relationship in a single reaction zone.

Reference will now be made to FIG. 3 showing an operating diagram of a hydrotreatment installation process known in the state of the art, in which the feedstock to be hydrotreated and the hydrogen circulate in co-flow relationship in a single hydrotreatment reaction.

The feedstock for the hydrotreatment installation, for example a cut of middle distillates from direct distillation, is fed by way of the line 100 and then heated in an oven (not shown in the Figure) in which the temperature of the feedstock is raised to the temperature required for the hydrotreatment reaction step. The feedstock then has added thereto a gaseous recycling flow (upstream or downstream of the oven), with a high hydrogen content, circulating in the line 330. The mixture formed in that way circulates in the line 200 and then feeds the hydrotreatment reactor 300 (also referred to herein as the hydrotreatment reaction zone 300) which is typically a reactor involving a fixed catalytic bed and a descending flow. The effluent from that reactor is discharged by way of the conduit 400 to be introduced into a separator balloon flask 500. The flask 500 makes it possible to separate a gaseous effluent 240 and a liquid effluent 600. The gaseous effluent 240 is cooled by way of one or more heat exchangers 250 (here an air cooler) to be at least partially condensed before being separated in a separator balloon flask 260 of gas/liquid/liquid type. A water flow 240a is preferably added to the gaseous effluent 240 to permit dissolution of the $NH_3$ present in the gaseous fraction in an aqueous liquid phase.

The separator balloon flask 260 implements separation into three phases:
 a gaseous flow 280;
 a liquid hydrocarbon fraction 220 with a very low sulphur content, for example of less than 10 ppm; and
 an aqueous liquid phase 270 which moreover generally contains nitrogenous and sulphurous impurities (such as ammonium sulphide salts).

The gaseous flow 280 comprising hydrogen and acid gases is introduced into an amine-type washing unit 290. The hydrogen-rich flow 320 issuing from the amine-type washing unit 290 is mixed with a hydrogen make-up 301 compressed by a compressor 310, the mixture 330 then being compressed in a compressor 340 and then recycled upstream of the hydrotreatment reaction zone. The liquid effluent 600 and possibly the liquid hydrocarbon fraction 220 are passed by way of the line 700 towards a stripping column 130 supplied with stripping steam 210. The gaseous fraction 150 is recovered at the head of the stripping column 130 and then cooled by way of one or more heat exchangers 201 (here an air cooler) before being introduced into a separator balloon flask 190 to obtain a gaseous flow 170 mainly comprising hydrogen, $H_2S$ and light hydrocarbons such as methane, a liquid flow 180 mainly comprising compounds of naphtha type, and a liquid flow 160 passed into the stripping column 130 as a reflux. The heavy fraction 140 comprising the hydrotreated cut of middle distillates is recovered at the bottom of the stripping column 130.

In the context of a conventional co-flow hydrotreatment process according to the state of the art as shown in FIG. 3 a substantial fraction of hydrogen is not recovered and occurs in the dissolved state in the liquid effluent 600 as the gas/liquid separation step at the exit from the hydrotreatment reaction zone in the reactor 300 is performed at the pressure and temperature in that reactor 300, that is to say typically a temperature of 360° C. and a pressure of between 3 and 13 MPa, within the context of cuts of middle distillates with a very low sulphur content. The liquid effluent 600 at the temperature and the pressure at the exit from the reactor 300 then comprises a part of hydrogen which has not been consumed, in dissolved form, which is not re-used. The loss of hydrogen due to dissolution therefore corresponds to the hydrogen present in the conduit 700 at the entry to the stripping column 130 and the exit 350 from the amine-type washing unit. To remedy that hydrogen loss and also the hydrogen loss due to chemical consumption of hydrogen in the hydrotreatment reaction, make-up hydrogen 301 is generally introduced into the process upstream of the hydrotreatment reaction zone, together with the hydrogen-rich flow 320 from the amine-type washing unit 290 after having been compressed by way of the compressor 301.

In order to maximise the recovery of unconsumed hydrogen at the issue from the hydrotreatment process the applicant developed a process in which the effluent from the hydrotreatment operation is subjected to a particular chain succession of separation steps making it possible to significantly reduce the hydrogen content in the hydrotreated feedstock to the required specifications, therefore making it possible to improve hydrogen recycling upstream of the hydrotreatment process.

Figure 4:
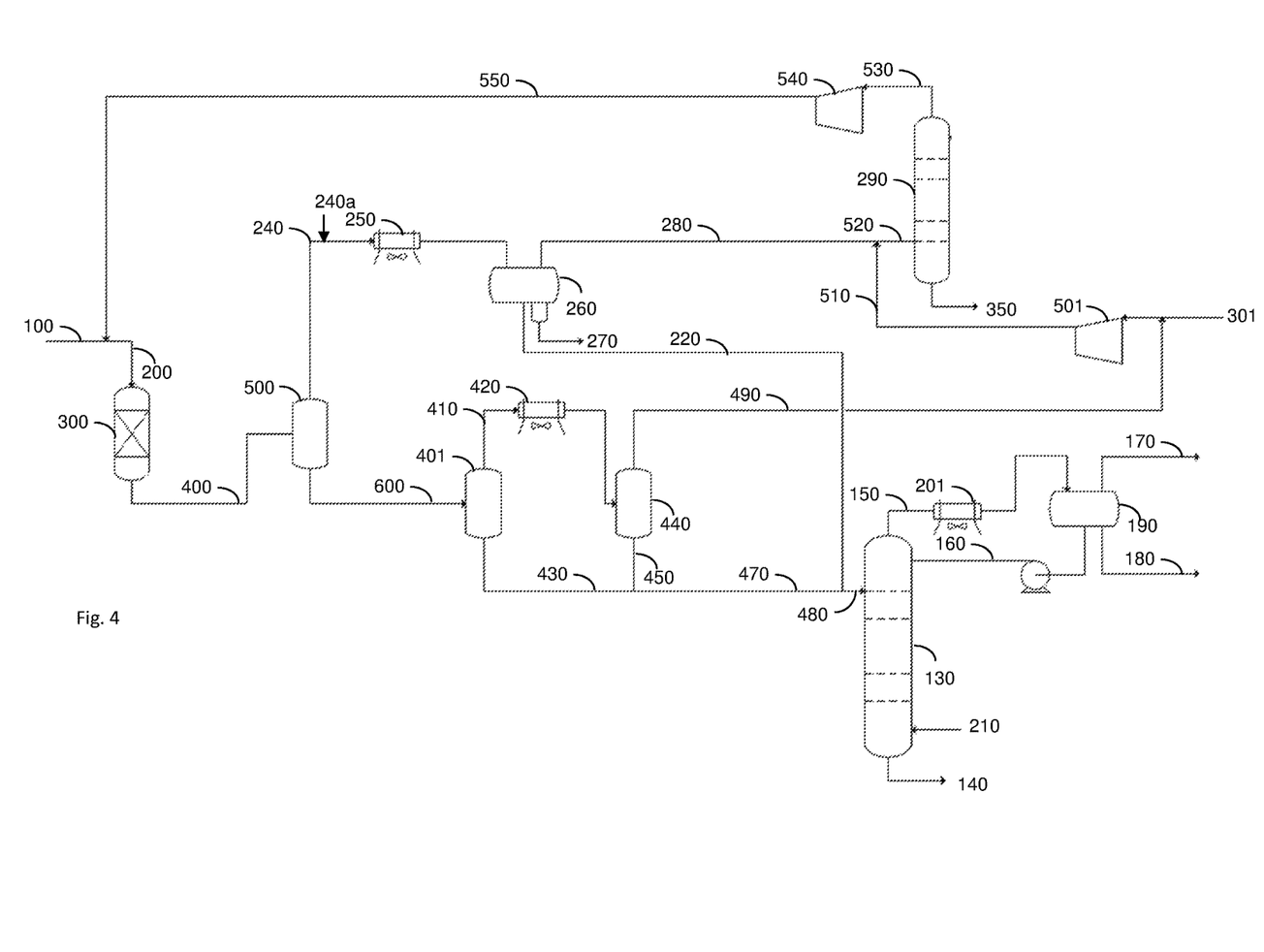
FIG. 4 is a representation of an operating diagram of a hydrotreatment installation according to the invention in which the feedstock and hydrogen circulate in co-flow relationship in a single reaction zone. In this figure references identical to those in FIG. 3 denote similar or identical elements.

More particularly and referring to FIG. 4 showing an operating diagram of a hydrotreatment installation according to the invention the feedstock of the hydrotreatment installation, for example a cut of middle distillates from direct distillation, is fed by way of the line 100 and then heated in an oven (not shown in the Figure) in which the temperature of the feedstock is raised to the required temperature for the hydrotreatment reaction step. The feedstock then has added thereto a gaseous recycling flow (upstream or downstream of the oven), with a high hydrogen content, circulating in the line 550. The mixture formed in that way flows in the line 200 and then feeds the hydrotreatment reactor 300 (also referred to herein as the hydrotreatment reaction zone 300) which is typically a reactor with a fixed catalytic bed and a descending flow. The hydrotreated effluent 400 is possibly cooled on issuing from the hydrotreatment reaction zone 300 by way of one or more heat exchangers (not shown in the Figure) to a temperature preferably between 20 and 320° C. and more preferably between 180 and 280° C. The hydrotreated effluent 400 which is possibly cooled is then discharged to be introduced into a separator balloon flask 500. The flask 500 makes it possible to separate a first gaseous effluent 240 and a first liquid effluent 600. The first gaseous effluent 240 is cooled by way of one or more heat exchangers 250 (here an air cooler) to be partially condensed before being separated in a separator balloon flask 260 of gas/liquid/liquid type. A water flow 240a is preferably added to the gaseous effluent 240 to permit dissolution of the $NH_3$ present in the gaseous fraction in an aqueous liquid phase.

The separator flask 260 implements separation into three phases:
- a gaseous flow 280;
- a liquid hydrocarbon fraction 220 with a very low sulphur content, for example less than 10 ppm; and
- an aqueous liquid phase 270 which moreover generally contains nitrogenous or sulphurous impurities (such as ammonium sulphide salts).

The gaseous flow 280 comprising hydrogen and acid gases is introduced by way of the line 520 into an amine-type washing unit 290 together with a gaseous flow 510 comprising the gaseous effluent 490 (referred to herein as the third gaseous effluent) which is compressed by way of a compressor 510 and possibly with the addition of a make-up amount of hydrogen 301.

The hydrogen-rich flow 530 from the amine-type washing unit 290 is compressed by a compressor 540 and then recycled upstream of the hydrotreatment reaction zone by way of the line 550.

The first liquid effluent 600 is in turn expanded by being introduced into a separator balloon flask 401 to obtain a second gaseous effluent 410 comprising hydrogen and sulphurous and nitrogenous compounds, and at least one second liquid effluent 430.

The pressure in the separator flask 401 is between 0.5 and 4 MPa, preferably between 1 and 3 MPa. The pressure in the flask 401 is regulated in such a way that it is approximately equal to the pressure of the make-up hydrogen 301, and taking account of the pressure drops caused by the heat exchanger 420. The second gaseous effluent 410 is cooled by way of a heat exchanger 420 (here an air cooler), preferably to a temperature of between 10 and 120° C. and more preferably between 30 and 90° C. to be at least partially condensed and is introduced into a separator balloon flask 440, referred to as the flash balloon flask, in order to obtain a third gaseous effluent 490 comprising hydrogen, sulphurous and nitrogenous compounds, and a third liquid effluent 450. The pressure in the flask 440 is regulated in such a way that it is between 0.5 and 4 MPa, preferably between 1 and 3 MPa, that is to say substantially equal to the pressure of the make-up hydrogen 301, while taking account of the pressure drops caused by the heat exchanger 420.

The third gaseous effluent 490 is passed toward the amine-type washing unit 290 as described hereinbefore. The third liquid effluent 450 is passed to the entry of the stripping column 130 by way of the conduits 470 and 480, possibly together with the second liquid effluent 430 from the separator balloon flask 401 and possibly together with the liquid hydrocarbon fraction 220 from the separator balloon flask 260. The stripping column 130 is fed with stripping steam 210. The gaseous fraction 150 is recovered at the head of the stripping column 130 and then cooled by way of one or more heat exchangers 201 (here an air cooler) before being introduced into the separator balloon flask 190 to obtain a gaseous flow 170 which mainly comprises hydrogen, $H_2S$ and light hydrocarbons such as methane, a liquid flow 180 mainly comprising compounds of naphtha type, and a liquid flow 160 which is passed into the stripping column 130 as reflux. The heavy fraction 140 mainly comprising the hydrotreated feedstock of middle distillates is recovered at the bottom of the stripping column 130.

Thus in the case of a hydrotreatment process in co-flow relationship according to the invention the unconsumed hydrogen issuing from the hydrotreatment reactor 300 is recovered by virtue of the separation steps which are successively implemented in the separator balloon flasks 401 and 440 in order to obtain a hydrogen-rich gaseous effluent 490 (also referred to herein as the third gaseous effluent 490) which can thus be recycled upstream of the process as a gaseous flow comprising hydrogen for implementing hydrotreatment of the hydrocarbon feedstock.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1557212, filed Jul. 28, 2015 are incorporated by reference herein.

EXAMPLES

The following example involves comparing the dissolved hydrogen loss in an operating process for hydrodesulphurisation with a very low sulphur content (target sulphur content: 10 ppm by weight) which is known in the state of the art, in which the feedstock and hydrogen circulate overall in counter-flow relationship (as shown in FIG. 1) and in the context of a hydrodesulphurisation process with a very low sulphur content according to the invention, in which the feedstock and hydrogen circulate overall in counter-flow relationship (as shown in FIG. 2).

The feedstock which is treated in the two configurations is a mixture of a gas oil cut from direct distillation of a crude oil and a catalytic cracking gas oil cut. The composition of the feedstock is described in greater detail in Table 1 hereinafter.

TABLE 1

| Composition of the feedstock | | |
|---|---|---|
| Nature of the feedstock | % by weight SR(*)/LCO(**) | 80/20 |
| Initial sulphur | Content in ppm by weight | 9063 |
| Initial nitrogen | Content in ppm by weight | 266 |

(*)SR: Straight Run (gas oil cut from direct distillation of a crude oil)
(**)LCO: Light Cycle Oil (catalytic cracking gas oil)

Example 1

Hydrotreatment Process According to FIG. 1 (Comparative Example)

Operating conditions in the reactors 3 and 8 (see FIG. 1):
hydrotreatment temperature=355° C.;
hydrotreatment pressure=4 MPa;
hourly space velocity (HSV)=0.85 $h^{-1}$;
temperature of the separator flask 10=358° C.

In accordance with the process shown in FIG. 1 the total loss of dissolved hydrogen which is ascertained and measured in the lines 12 and 35 (see FIG. 1) is 226 kg/h.

Example 2

Hydrotreatment Process According to FIG. 2
(According to the Invention)

Operating conditions in the reactors 3 and 8 (see FIG. 2):
hydrotreatment temperature=355° C.;
hydrotreatment pressure=4 MPa;
hourly space velocity (HSV)=0.85 h$^{-1}$;
temperature of the separator flask 10=358° C.;
temperature of the stripping column 13=260° C.;
pressure in the separator flask 40=2.1 MPa; and
temperature in the flask 44=50° C.;
Ratio H$_2$/HC=168 Nm$^3$/Sm$^3$.

H$_2$/HC is defined as the ratio by volume between hydrogen (in normal m$^3$, that is to say in m$^3$ at 0° C. and 0.1 MPa (1 bar)) and the hydrocarbon compounds (in standard m$^3$, that is to say in m$^3$ at 15° C. and 0.1 MPa (1 bar)).

In accordance with the process shown in FIG. 2 the total loss of dissolved hydrogen which is ascertained and measured in the lines 48 and 35 is 106 kg/h.

Table 2 hereinafter summarises the losses of H$_2$ in the process according to the state of the art (FIG. 1) and according to the invention (FIG. 2) as well as the cost associated with the loss of hydrogen over a period of 20 years (at a rate of 8000 h/year and a fixed hydrogen cost of 1800 €/t).

TABLE 2

| Loss of H$_2$ (kg/h) and associated cost | | |
|---|---|---|
| Simulated counter-flow hydrotreatment process | Losses in H$^2$ (kg/h) | Cost over 20 years (M€) |
| According to the state of the art (FIG. 1) | Line 12: 213<br>Line 35: 13 | 65 |
| According to the invention | Line 48: 93<br>Line 35: 13 | 30 |

It is observed that the loss of hydrogen which is dissolved in accordance with the simulated counter-flow hydrotreatment process according to the invention (106 kg/h) is greatly inferior than that of a simulated counter-flow hydrotreatment process in accordance with the state of the art (226 kg/h). The reduction in the loss of hydrogen in the simulated counter-flow hydrotreatment process according to the invention leads to an economy of 35 M€ over 20 years with respect to a conventional procedure.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the hydrotreatment of a hydrocarbon feedstock comprising sulphurous and nitrogenous compounds, in which the following steps are effected:
   a) at least one hydrotreatment step is implemented in which at least a part of said feedstock and a gaseous flow comprising hydrogen is brought into contact with at least one hydrotreatment catalyst to obtain a hydrotreated effluent (9,400) comprising hydrogen, and sulphurous and nitrogenous compounds;
   b) gas/liquid separation of said hydrotreated effluent (9,400) obtained in step a) is implemented to produce at least one first gaseous effluent (23,240) and at least one first liquid effluent (11,600);
   c) the first liquid effluent (11,600) obtained in step b) is expanded to a pressure of between 0.5 and 4 MPa and said first liquid effluent (11,600) is separated to obtain at least one second gaseous effluent (41,410) comprising hydrogen and sulphurous and nitrogenous compounds, and at least one second liquid effluent (43,430);
   d) said second gaseous effluent (41,410) obtained in step c) and comprising hydrogen and sulphurous and nitrogenous compounds is cooled and then separation of said second gaseous effluent (41,410) is effected to obtain at least one third gaseous effluent (49,490) comprising hydrogen, sulphurous and nitrogenous compounds and at least one third liquid effluent (45,450); and
   e) at least a part of said third gaseous effluent (49,490) obtained in step d) comprising hydrogen and sulphurous and nitrogenous compounds is recycled to step a) as a gaseous flow comprising hydrogen provided to step a).

2. A process according to claim 1 characterised in that in step e) said part of said third gaseous effluent is mixed with a gaseous hydrogen make-up flow (30,301).

3. A process according to claim 1 characterised in that in step d) said second gaseous effluent (41,410) is cooled to a temperature of between 10 and 120° C.

4. A process according to claim 1 characterised in that between steps a) and b) the hydrotreated effluent (9,400) obtained in step a) is cooled to a temperature of between 20 and 320° C.

5. A process according to claim 1 characterised in that said hydrotreatment step a) is carried out in a reaction zone (300) in which said feedstock and said gaseous flow comprising hydrogen circulate in descending co-flow relationship in said reaction zone (300) to obtain a hydrotreated effluent (400) comprising hydrogen and sulphurous and nitrogenous compounds.

6. A process according to claim 1 characterised in that said first gaseous effluent (240) obtained in step b) is cooled then passed into a separator balloon flask (260) to obtain a gaseous flow (280), a liquid hydrocarbon fraction (220) and an aqueous liquid fraction (270).

7. A process according to claim 6 characterised in that said gaseous flow (280) is passed into the washing unit (290) comprising an absorbent solution comprising amines.

8. A process according to claim 1 characterised in that said third gaseous effluent (490) comprising hydrogen and sulphurous and nitrogenous compounds is passed into a washing unit (290) comprising an absorbent solution comprising amines.

9. A process according to claim 7 characterised in that the head flow (350) issuing from the washing unit (290) is recycled upstream of the hydrotreatment step as the gaseous flow comprising hydrogen.

10. A process according to claim 1 characterised in that the hydrotreatment step a) is carried out in a first reaction zone (3) to produce a partially hydrotreated feedstock (4) and then in a second reaction zone (8) to obtain a hydrotreated effluent (9) comprising hydrogen and sulphurous and nitrogenous compounds.

11. A process according to claim 10 characterised in that between the first reaction zone (3) and the second reaction zone (8) a step for separation of said partially hydrotreated feedstock (4) comprising hydrogen and sulphurous and nitrogenous compounds is effected to produce at least a gaseous fraction (24) and a liquid fraction (6) which is passed into said second reaction zone (8).

12. A process according to claim 11 characterised in that the gaseous fraction (24) is cooled then passed into a separator balloon flask (26) to obtain a gaseous flow (28), a liquid hydrocarbon fraction (22) and an aqueous liquid phase (27).

13. A process according to claim 10 characterised in that said third gaseous effluent (49) comprising hydrogen and sulphurous and nitrogenous compounds is passed into a washing unit (29) comprising an absorbent solution comprising amines.

14. A process according to claim 12 characterised in that said gaseous flow (29) is passed into the washing unit (29) comprising an absorbent solution comprising amines and that the head flow (35) issuing from the washing unit (29) is recycled upstream of the second reaction zone (8) as the gaseous flow comprising hydrogen.

15. A process according to claim 10 characterised in that the first gaseous effluent (23) obtained in step d) is passed upstream of the first reaction zone (3).

\* \* \* \* \*